United States Patent [19]

Rando et al.

[11] Patent Number: 4,939,355
[45] Date of Patent: Jul. 3, 1990

[54] AUTOMATIC PACKAGE LABEL SCANNER

[75] Inventors: Joseph F. Rando, Los Altos Hills, Calif.; H. Nicks Roberts, Eugene, Oreg.

[73] Assignee: Spectra-Physics, Inc., San Jose, Calif.

[21] Appl. No.: 147,815

[22] Filed: Jan. 22, 1988

[51] Int. Cl.$^5$ .............................................. G06K 7/10
[52] U.S. Cl. ................................... 235/467; 235/462; 235/470
[58] Field of Search ........................ 235/462, 467, 470

[56] References Cited

U.S. PATENT DOCUMENTS

| | | | |
|---|---|---|---|
| 3,988,573 | 10/1976 | Hayosh et al. | 235/467 X |
| 4,064,390 | 12/1987 | Hildebrand et al. | 235/467 X |
| 4,652,732 | 3/1987 | Nickl | 235/467 X |
| 4,808,804 | 2/1989 | Krichever et al. | 235/462 |

Primary Examiner—David L. Trafton
Attorney, Agent, or Firm—Donald C. Feix; Paul Davis; Thomas M. Freiburger

[57] ABSTRACT

A point of sale bar code scanner, such as a grocery store check-out label scanner, that is attendant-free and completely automated in providing a listing or a total pricing of a customer's selected items. At each automated check-out, the customer initiates the process, places items on a conveyor, which carries each item separately through a scanner. The scanner reads all sides of each package, including the bottom of the package, since the bar code label could be located on any surface. Serial conveyors are used, and gates preferably control the advancement of items onto a conveyor which will carry the item through the scanning area, such that only one item can be scanned at a time. The conveyor in the scanning area includes a series of belt strips through which an upwardly scanned beam can read the package bottom. Various methods and systems are disclosed for handling "no reads". The customer signifies termination of the process at the appropriate time. In the process the customer receives some sort of identification tag.

30 Claims, 9 Drawing Sheets

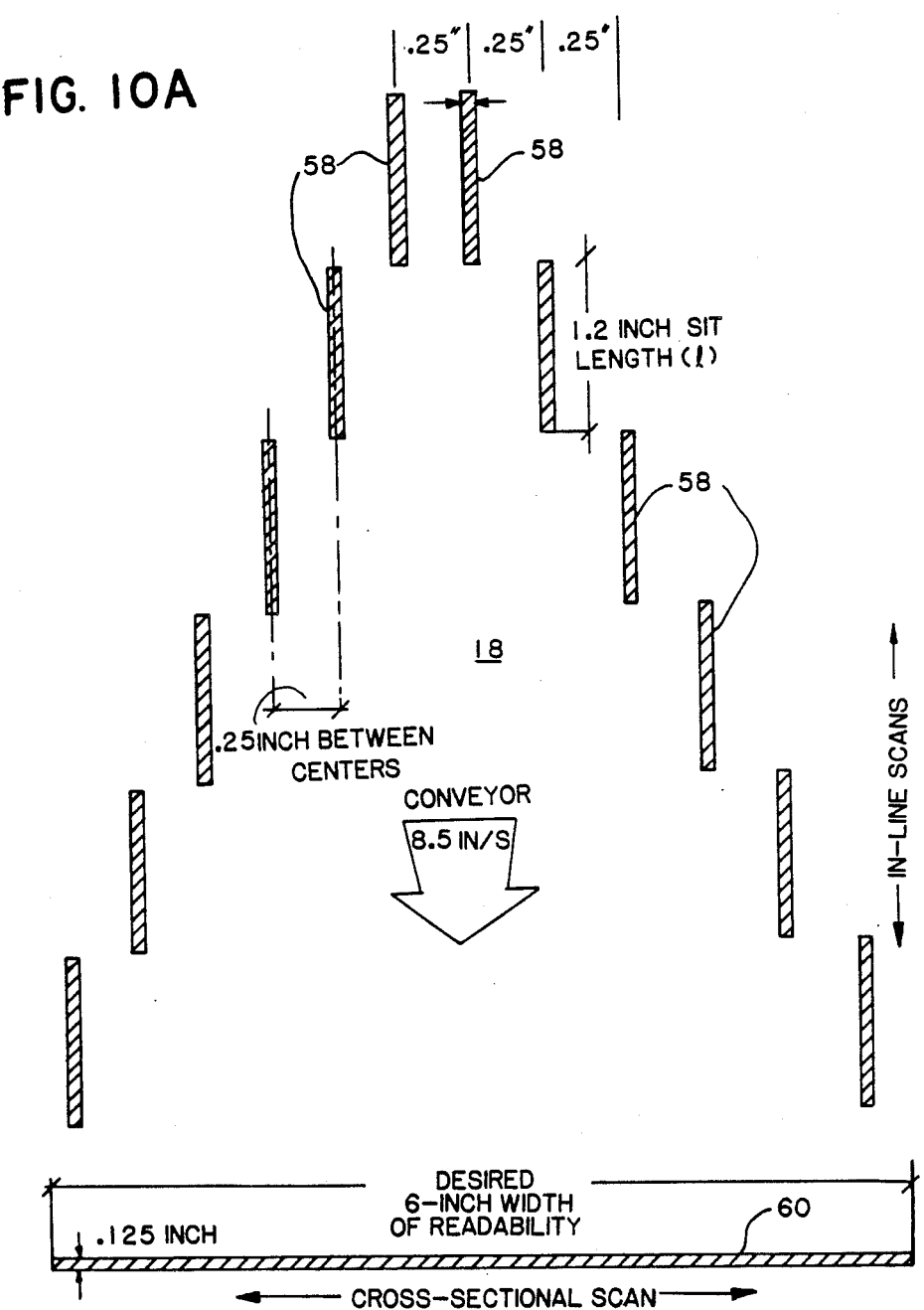

AUTOMATIC PACKAGE LABEL SCANNER

BACKGROUND OF THE INVENTION

The invention relates to laser bar code scanning apparatus. More specifically, the invention is concerned with a method and system for automated substantially attendant-free scanning of items or packages bearing bar code labels.

Bar code scanners have been in increasing use for scanning the UPC and other types of bar codes on packages or containers, particularly in retail stores with recent emphasis on grocery stores. Generally, in retail stores the scanners are set up at check-out stands, built into the horizontal check-out deck so that a laser beam is scanned up through a transparent window, defining a number of different scan lines in a scan geometry. Normally packages are placed by the customer on the counter or deck or on a conveyor. A check-out person then takes each package, visually locates or perceives the UPC or other bar code label on the package and moves the package through the scanner's scanning area holding the package in a particular orientation which will effect a good read by the scanner as the bar code traverses through the scanning area.

Some attempts have been made to minimize or eliminate the participation of checkout personnel For example, in one system the customers themselves were directed to move the bar code bearing items through the scanning area in order to effect a listing and summation of the items and charges by computerized equipment associated with the scanner. Such a system has been marketed under the name Check Robot by Check Robot, Inc.

However, prior to the present invention, operator participation in the use of a point of sale scanner was always required, whether the operator was the customer or retail store personnel. It is an object of the present invention to eliminate or substantially eliminate any need for an operator to move items through a scanner, by automatically moving items through a scanning area and reading the bar codes on each item, regardless of orientation, so as to produce a listing and summation of items and charges almost totally automatically.

SUMMARY OF THE INVENTION

In accordance with the present invention, reading of bar codes on packages or items is accomplished virtually attendant free in a substantially fully automated manner.

As a retail point of sale (POS) item scanner, the system of the invention enables a retail customer to place selected items one-by-one on a conveyor at a checkout location. The items are advanced by the conveyor and preferably serial conveyors are used so that items may be delayed at certain points to avoid two items being readable at any one time. Gate devices may be included in the system, sensing the advancing items and controlling the conveyors, delaying the admission of an additional item to the scanning area until a first item has been read or passed through the scan area. The scanner is enabled by the first item gate and disabled when the item is read. It may be enabled again when the item already read has left the scanner and the next item passes the first item gate. Alternatively, it may be enabled for reading only the new item, provided means are included for discriminating from the already-read item while it remains in the scan region.

In the scanning area, the item is transported by a moving conveyor through a scan volume comprised of a series of different scan patterns or lines approaching from different sides of the item. Preferably a single laser beam, or a pair of laser beams, are deflected by moving mirrors or a holographic beam deflector/scan generator to produce scan geometry which approaches the package or item from the top, angularly toward the sides so as to be capable of reading all sides, and also from the bottom of the package.

This scanning ability requires a rather large depth of field for the scanned beam(s) This is true because the package or item may be placed at a range of positions on the conveyor as it travels through the scan volume; because of widely differing sizes of items; and because the bar code label could be located almost anywhere on any of the sides or ends of the package.

Such long depth of field is generally not possible from the laser beam in conventional product scanner apparatus, which typically relies on the correct bar code-bearing panel of a package being moved by a skilled operator closely adjacent to a surface-mounted scan window. Further, such depth of field generally is not available in the waist of a focussed beam, which in practical terms is limited in its depth of field to about plus or minus 1 ½ inch for reading UPC bar codes. However, the present invention employs an extended depth of field beam system. In this system a pair of lasers, such as laser diodes, may be oriented at 90° to each other but, using a beam-combining reflector/transmittor, directed substantially into a common alignment. One beam has its range of acceptable focus farther distant than that of the other beam. The two beams preferably are pulsed in opposition to one another so that when one beam is "on" the other beam is "off", and the detecting apparatus therefore knows which beam is being used when a bar code is detected and read.

In this way, the depth of focus enhancement system "stacks" one beam in tandem with another in effect to double the depth of field of the composite beam, i.e. the depth or distance within which a bar code can be located for obtaining an accurate read. A six inch effective depth of field can be achieved with two laser beams.

An important aspect of the present invention is the handling of bottom reads. Since the bar code label may be on the bottom of a package, provision must be made for scanning the laser beam over the package's bottom as well as over all other surfaces. Different approaches are theoretically possible, such as using transparent belts, or sliding the product over a stationary glass window (which may be inclined) through which the beam is scanned. These approaches generally have problems. For example, a window over which items are repeatedly moved will scratch and the scratches in this case will be in the plane of focus of the scanning beam. Static and bad reads will occur.

In the preferred embodiment of the invention a conveyor is used for bottom reading which comprises a series of discrete belts or belt strips having parallel spaces between them through which the beam(s) is upwardly scanned. This provides a series of scan lines in one orientation, which will read the bottom-mounted UPC bar code if its bars are oriented anywhere from perpendicular to the scan lines preferably up to 45° to the scan lines. The discrete belts are narrow enough, and the adjacent space is narrow enough, that a bar code at 45° will be read by a scan line on one side or the other of each belt section when the UPC bar code label fully straddles the belt.

The UPC bar code label comprises two halves read separately, each half having an oversquare amount sufficient to permit the label half to be read by one scan line or the other on either side at the belt strip with the label at a worst case angle of 45°. In other words, there are a series of parallel equally spaced scan lines oriented in the direction of travel of the items. The spacing between scan lines (with a belt between them) preferably is small enough that with the label at 45°, at least one of the parallel scan lines must cross all the bars in the half-label. This means, in the critical case where one scan line cuts diagonally across the base square of the half-label, an adjacent line must still cross all bars with the oversquare amount included. To meet this requirement, the maximum spacing between scan lines must be the bar code oversquare amount times one-half the square root of 2. For non-UPC bar codes that do not incorporate the "oversquare" feature, more complex scan line geometries are often required. This invention permits more complex scan geometries to read undersquare bar codes.

For bottom-located UPC bar code labels which are oriented at less than 45° with respect to the belt strips and to the scan lines between them, at least one additional scan line perpendicular to the belts is generated. Preferably a transverse scan line is included at the end of the series of belt strips, i e. scanning a line generally parallel to and adjacent to a roller on which the belt strips or sections are mounted. There may be such a scan line at one or each of the forward and rearward ends of the conveyor which takes the packages through the scan area. That is, a beam may be scanned in a generally vertical plane both forward and aft of the scan area conveyor, the vertical planes being substantially perpendicular to the line of advancing movement of each of the belt strips. The scan lines generated by scanning in these vertical planes will read UPC bar code labels having bars perpendicular to the vertical planes up through labels having bars oriented at 45° to the vertical planes and to the scan lines generated therein. In fact, because of the oversquare feature of UPC bar codes, such a scan line will read labels at somewhat less than 45° to the scan line. However, the oversquare is intended to allow time to assure a read on a moving item.

Alternatively, the 45° criterion need not be rigidly adhered to. The parallel scan lines may be slightly farther apart than described above, provided they are sufficiently close that, considering the speed of conveyor movement and the repetition rate of the transverse scan line, substantially all orientations of bottom-located bar codes which are not read by the transverse scan line will be read by one of the parallel scan lines.

The invention also includes provision for handling "no reads". These can be handled in a number of different ways. First, if an item is not read on passing through the scan volume as determined by the item's moving through an exit gate without a sucessful read, the product preferably is returned to the customer via a return conveyor or a reversing of a conveyor, and an indicator instructs the customer to again place the item on the lead-in conveyor. It may instruct the customer to rotate the item.

If a "no read" again occurs, the package can then be recorded by a video camera for later reference of a cashier in identifying the product and its price. The video signal is stored and played back on a monitor at the cashier, so that the cashier can recognize the product and look up its price. Alternatively, the customer may be instructed by the system to carry the "no read" items separately to the cashier for manual checking.

In another system for handling "no reads", an auxiliary scanner is located adjacent to the automatic scanner. This scanner can comprise a fixed scanning "X", over which or past which the customer is automatically instructed to move the item, with the bar code properly oriented. Alternately this auxiliary scanner can comprise a light pen, with the customer instructed to move the light pen over the item's bar code.

The system of the invention preferably provides an itemized tally of a customer's selections, preferably with prices and with a total or subtotal. This may be printed on a receipt-like paper presented automatically to the customer. The customer may then carry the tally sheet or paper to the cashier, who will add onto the total any remaining "no read" items before collecting payment from the customer. The information may in addition or alternatively be conveyed electronically to the cashier.

Alternatively, the system can give to the customer a list and description of all items selected, without totaling the list. Instead, a code can be imprinted on the tally sheet, such as a machine-readable bar code or other machine-readable code, containing the total price of all the items. This code can then be read by the cashier's machine (or the information can be sent electronically to the cashier), and any "no reads" can be added to the total at that point.

The system may convey the itemized list electronically to the cashier, with customer identification (or scanner lane number), without handling by the customer.

Items in the store without a fixed price, such as items sold by weight, can be handled as "no reads". However, the store will preferably have its own bar code encoding label printer at the location where the customer selects, weighs and bags the items, as many stores currently have.

The system of the invention therefore avoids the need for a cashier or checkout personnel at each checkout station in a retail store, and enables the use of only minimal personnel as cashiers after items have already been checked and totaled automatically. The system is also applicable to non-retail situations, such as automatic monitoring and recording of inventory on input to a store, warehouse or distribution center. The system may be employed whenever items are conveyed from one point to another.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 4 also indicates an idealized cube within which a bar code can be read.

FIG. 8 also shows the location of a series of scan lines in parallel scanning planes between the belts and at one end of the scan volume conveyor.

FIGS. 10A, 10B, 10C and 10D are views showing schematically basic components of a system of mirrors for providing the bottom scan. FIGS. 10A and 10B are plan views, FIG. 10C is a side elevation view and FIG. 10D is a transverse elevational section view.

DESCRIPTION OF PREFERRED EMBODIMENTS

Figure 1:
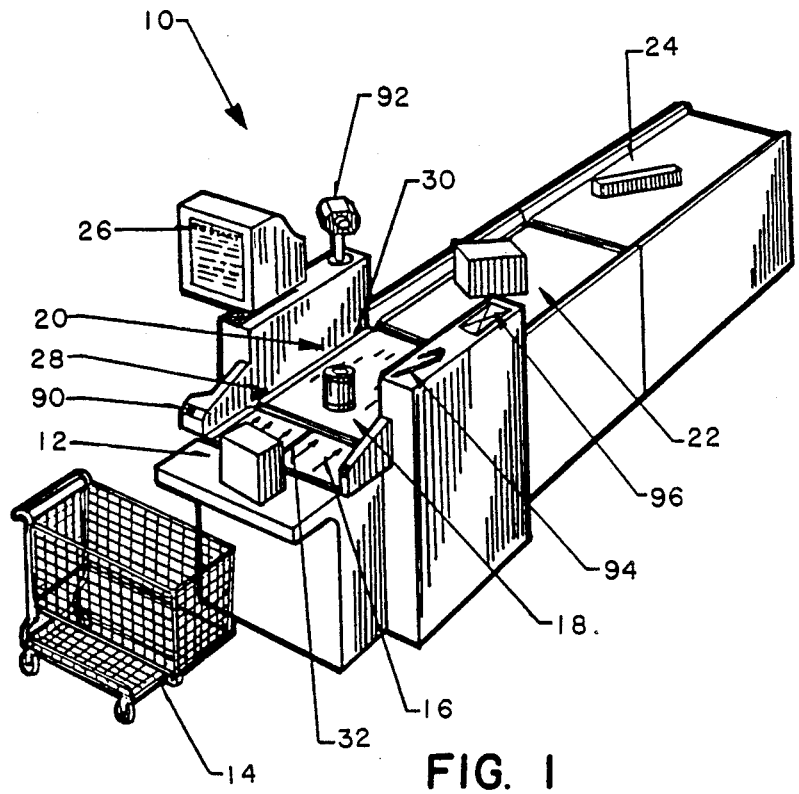
FIG. 1 is a perspective view generally indicating the system of the invention.

In the drawings, FIG. 1 shows an automatic package label scanner generally identified by the reference number 10. The system includes a shelf 12, adjacent to which a customer's basket 14 may be positioned for unloading of items; a lead-in conveyor belt 16; a scan area conveyor 18, for conveying items through a scan area or scan volume generally identified by the reference number 20 within which laser scanning lines are generated in a scan geometry designed to read all six sides of a typical box-shaped item; an exit conveyor 22; an exit storage area 24, such as for bagging of items read in the scan region or area 20; and a screen or display 26 for instructing the customer.

Item gates 28 and 30, which may comprise photoelectric sensors, are positioned at the input and exit ends of the scan area 20, respectively, i.e. at the beginning and end of the scan area conveyor 18 as indicated. The item scanner is enabled by the first item gate 28 and preferably disabled when the item passing through is read. The scanner is enabled again when the item already read has left the scan area 20, passing the exit item gate 30, and the next item has passed the entry item gate 28. Once the first item is read, the scan belt may be speeded up to hasten that item's exit. In the event the first item has not left the scanning area or scanning region 20 before the second item crosses the item input gate 28, the input belt 16 may be stopped or automatically reversed to temporarily retard the progress of the second item.

Alternatively, the scanner may scan a new item entering the scan region after the first item is read but before it leaves the scan region. This may be by more sophisticated equipment for discriminating from the already-read item or following its progress and ignoring further reads which emanate from its position or blocking scan lines at its position.

The display 26, on approach by the customer, will instruct the customer to place items one at a time on the center line 32 of the input belt 16.

The system of the present invention addresses security by the fact that once the item has left the customer's hands, it is either read and conveyed through the scan region 20 to the bagging area 24, or it is not read and is returned to the customer in any of several possible means. The handling of "no reads" is discussed below.

Figure 2:
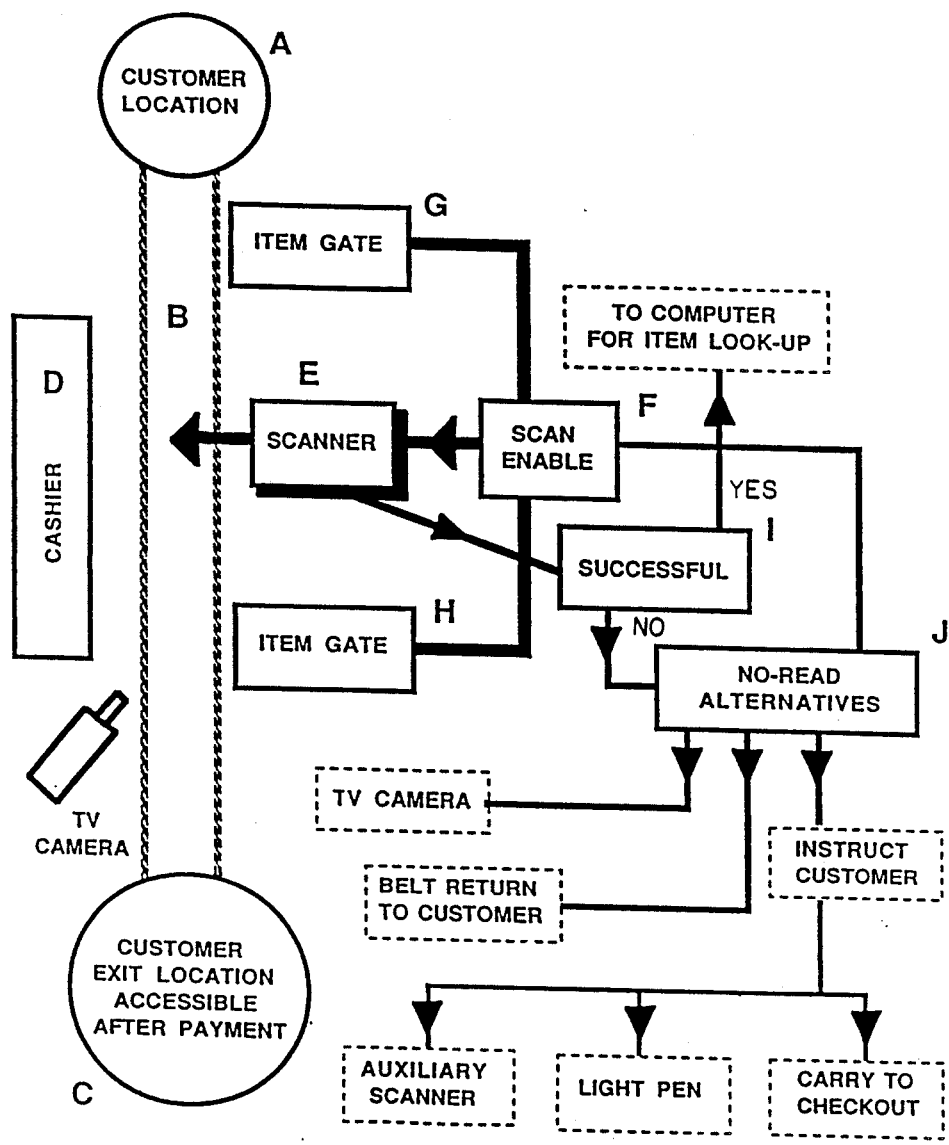
FIG. 2 is a schematic block diagram indicating components and steps involved in the process and system of the invention.

FIG. 2 is a block diagram and schematic layout showing the system of the invention and the manner in which it is used by a customer. FIG. 2 also indicates interaction between components of the system.

FIG. 2 shows the customer location A and generally indicates a conveyor belt or conveyor means or series of conveyor belts B between the customer location and a customer exit location C. The customer exit location becomes accessible after payment at a cashier D.

The scanner E is shown directed at the conveyor belt area and connected to a scan enable F which may be controlled by item gates G (28) and H (30) generally at either end of the scan region. A successful read is indicated at I, as a signal from the scanner E. In the event of a successful read, the scanning apparatus is shown sending a signal to the computer for item look-up.

No-read alternatives J include, as indicated, a TV camera which is enabled to store an image of a no-read item in the case of a no-read; a return of the item to the customer via the belt with reversal of the conveyor; and/or an instruction displayed for customer action. As indicated further in FIG. 2, these actions may include instructions to use an auxiliary scanner, which may be fixed; the use of a light pen for reading the subject bar code manually by the customer; or an instruction for the customer to simply carry the no-read item to the cashier. Another means to handle no-reads is to include with the equipments described in FIGS. 1 and 11 a separate conveyor (not shown) to deliver unreadable items to a special location where a clerk scans them or keys them in.

Figure 3A:
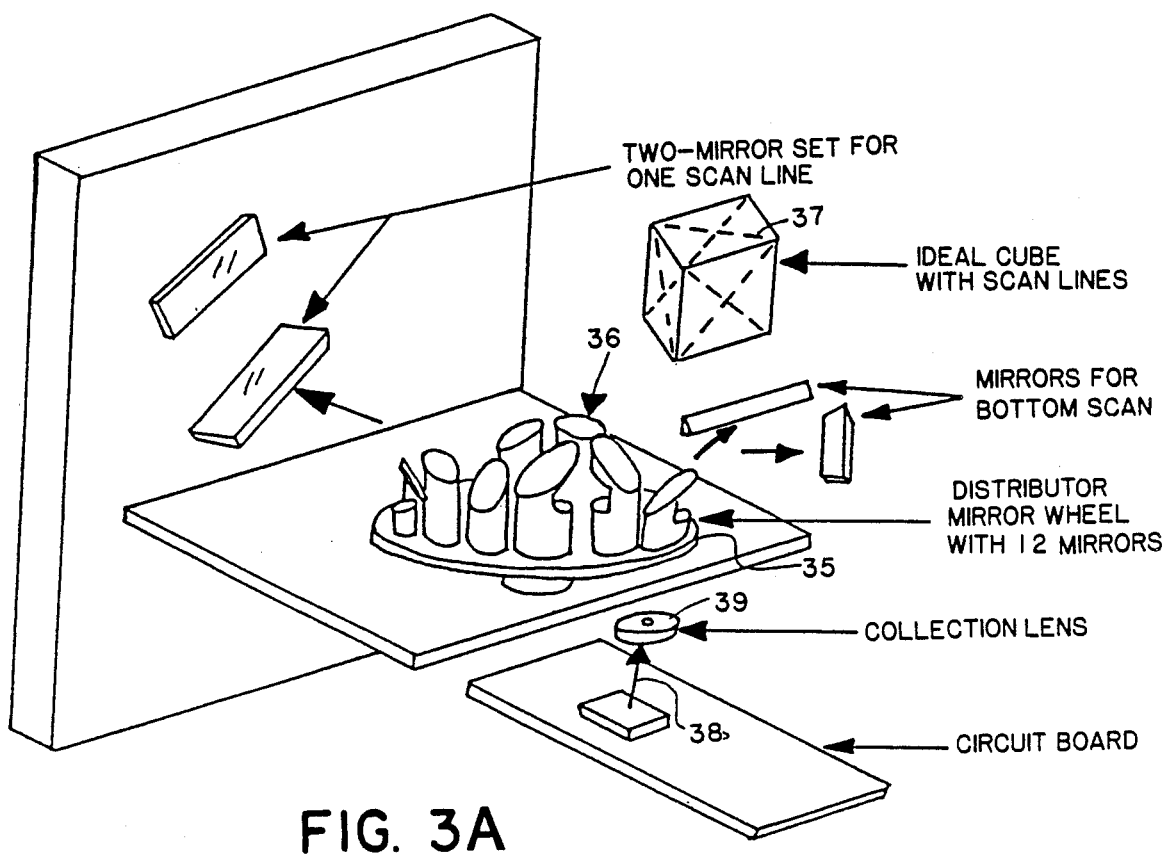
FIG. 3A is a greatly simplified perspective view schematically indicating a beam distributor wheel in a general layout for generating scan geometry for reading all sides of an item passing through a scan volume.

FIG. 3A is a simplified schematic drawing in perspective illustrating in general one arrangement which may be employed to generate scan geometry for reading all six surfaces of a typical item. FIG. 3A shows the function of a distributor wheel 35 and the location of an idealized cube with respect to the distributor wheel.

The rotating distributor wheel 35 may have 12 different mirrors (as collectively indicated as 36), for effecting the generation of scan geometry including an "X" scan projected in five different directions (four directions for scanning the vertical surfaces of an item and one projected downwardly at the top), and for generating the bottom scan, all toward the idealized cube 37.

FIG. 3A indicates a laser beam 38 projected up through a "bifocal" focusing and collection lens 39 to be distributed in a number of different beam sweeps (which may be twelve) by the mirrors 36 on the distributor wheel 35. FIG. 3A is simplified and only generally indicates a few of the mirrors which serve to direct the scanning beam into the appropriate scan line after reflection of the beam from the respective mirrors 36 of the distributor wheel.

Figure 3B:
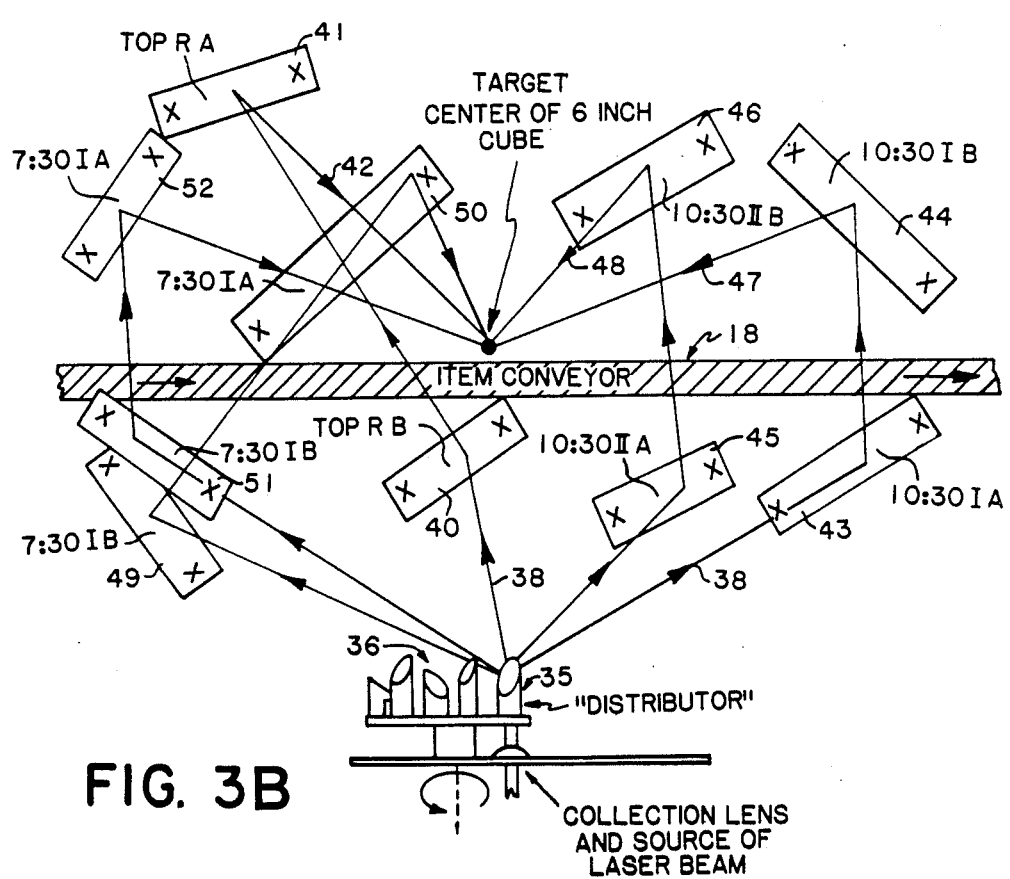
FIG. 3B is a longitudinal side elevation view schematically indicating right-side laser scan paths for scan geometry which may be used in accordance with the invention.
Figure 4:
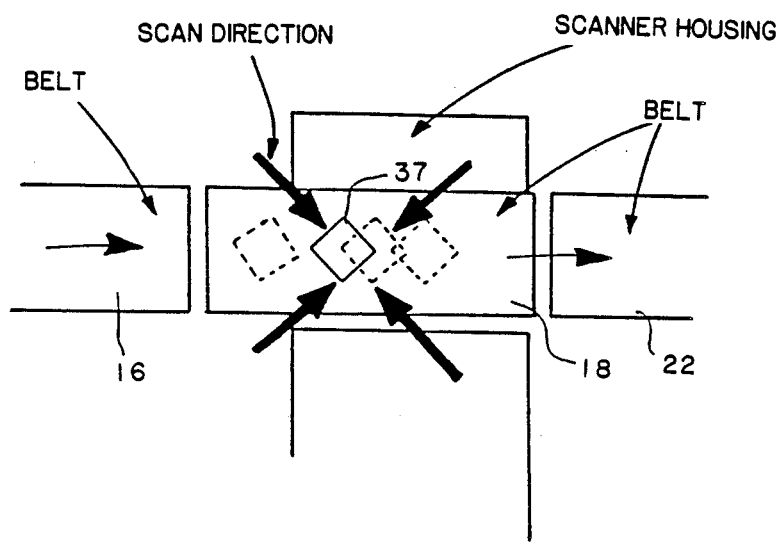
FIG. 4 is a schematic top plan view showing directions of scanning for four vertical faces of an item moving on a conveyor in the system.

FIG. 4 indicates the scan directions preferably used in effecting scanning of the vertical faces of an item. As indicated in all of FIGS. 3A through 7, the projected X configuration, i.e. two scanning planes to produce scan lines substantially at right angles, will read any bar code label moved through the scan X assuming that the label passes through the beam waist wherein the beam is sufficiently focused to resolve the bar code lines. FIG. 4 shows that the four scan directions for the vertical faces of the idealized cube or item 37 preferably are at 45° approaching from the front and 45° approaching from the rear.

FIG. 3B, which can be considered to be a side elevational view, partly in section, shows generally the laser paths which may be used in accordance with the invention to achieve the "X" scans of FIG. 4 and also the top scan, but excluding the bottom scan. The scan region conveyor 18 is shown in profile, with the direction of movement from left to right in FIG. 3B as indicated by arrows. The beam distributor wheel 35 is seen below the conveyor 18, and the distributor wheel is rotating at an appropriate rate to achieve the proper repetition rate for each of the scan lines. The rate of rotation may be on the order of about twenty-five revolutions per second.

FIG. 3B shows only the right scan laser paths, with the left scan (not shown) being somewhat similar, with certain differences. Beam directing mirrors are indicated for each of five scan lines generated with the right scan laser paths (excluding bottom scans). For example, for generating one scan line in the top scan "X", the laser beam SB after leaving the appropriate distributor wheel mirror 36 is reflected by beam directing mirrors 40 and 41, ultimately to be directed toward the target, i.e. the center of a six inch idealized cube. The final path of this scan line is indicated by an arrow 42 in FIG. 3B.

As also shown in FIG. 3B, the beam 38 after leaving a different distributor wheel mirror 36 is reflected by beam deflecting mirrors 43 and 44 to produce one scan line of the scanning "X" which approaches from the front right of the idealized cube 37 (as shown in FIG. 4). The other scanning line of this same front right scanning "X" is produced by another distributor mirror wheel mirror and by beam deflecting mirrors 45 and 46. The final scan paths of the two lines that make up this scanning "X" are indicated by arrows in FIG. 3B at 47 and 48.

Similarly, the scanning "X" which approaches from the rear right of the idealized cube (see FIG. 4) is produced by two further distributor wheel mirrors and by beam deflecting mirrors 49-50 and 51-52, respectively, as indicated.

As mentioned above, a generally similar arrangement of mirrors, not shown, produces the scanning "X's" approaching the idealized cube from the left side, and those mirrors also producing the "left" scan line to complete the top scan "X".

Figure 5:
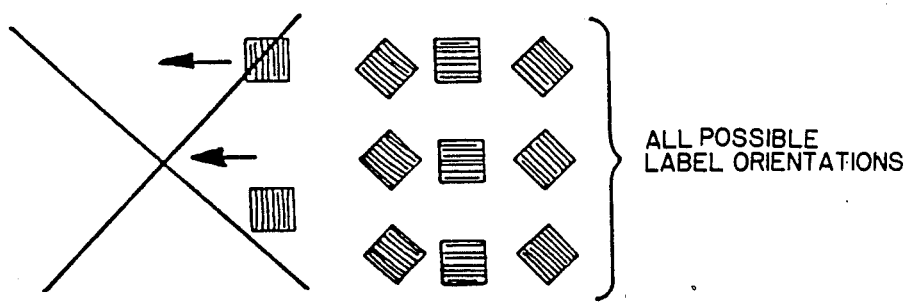
FIG. 5 is a schematic plan view illustrating the principle of reading a moving bar code label with an "X" scan configuration.

FIG. 5 illustrates the principle that any UPC label oriented at any angle in the plane of the paper will be scanned by a scan line which crosses all the black and white bars of the label. UPC labels which are not in the plane can also be read as long as a single scan crosses all the black and white bars.

Figure 6:
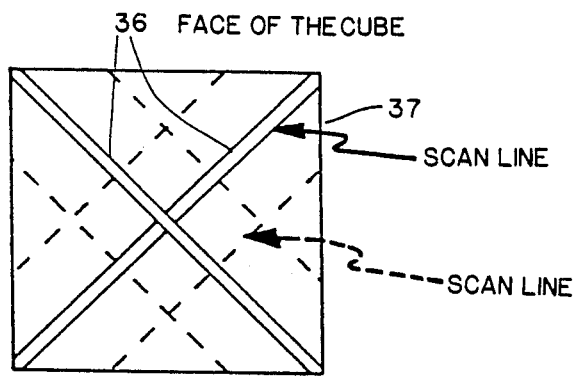
FIG. 6 is a view showing "X" scan lines on the face of a cube representing a scanned volume.

FIG. 6 illustrates the scanned beam X configuration which preferably is projected onto each of the four vertical faces of a cube representing the item passing through the scan volume. FIG. 6 indicates with dotted lines at progressive positions the relative motion of the scan lines on the face of the cube 37, as the item is moved through the scan area. The item may be placed in any orientation, on the scan region belt 18, including with two faces parallel to the belt 18 or diagonally with respect to the belt 18 (see FIG. 4). The projected scan lines forming the X scan will strike the vertical item faces obliquely if the item is parallel to the belt, but still will cross the faces in acceptable focus for reading the bar code, in accordance with the present invention.

Figure 7:
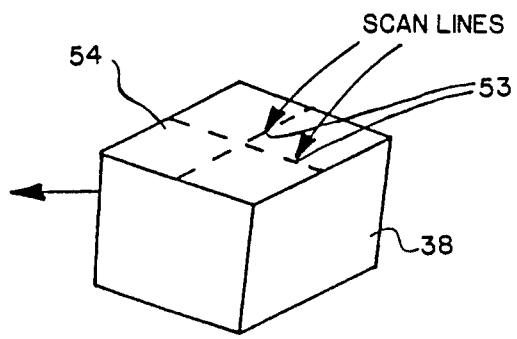
FIG. 7 is a perspective view showing an "X" scan pattern imposed on the top surface of a moving item.

FIG. 7 illustrates an X configuration of scan lines 53 approaching the item or cube 37 from above, striking the top surface 54 of the item as the top scan. Again, as the item progresses through the scan volume or scan region, the bar code if located on the top surface 54, will be read by at least one of the X scan lines 53, assuming parameters of speed of product movement, beam focus, scan repetition rate, etc. are met.

Figure 8:
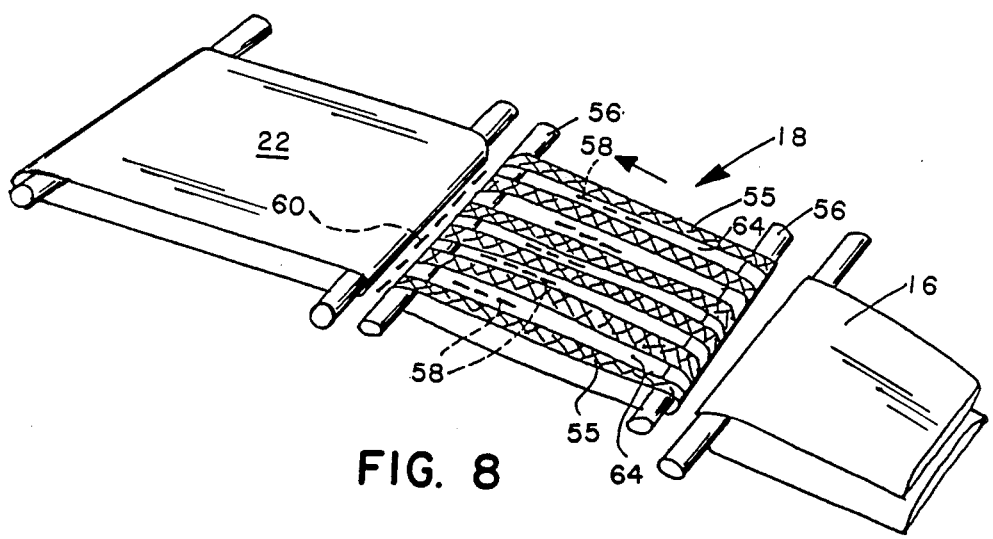
FIG. 8 is a perspective view showing a scan area conveyor of the invention for accomplishing bottom reading, and comprising a plurality of discrete belts with spaces between the belts.

FIG. 8 illustrates schematically the conveyor means and system by which bottom reading is accomplished in accordance with the invention. In this preferred embodiment, the scan region conveyor 18 comprises a series of parallel discrete belts or belt strips 55, supported on rollers 56 and retained in properly spaced configuration. FIG. 8 illustrates in dashed lines a series of bottom read scan lines 58 which project upwardly in substantially vertical planes between the adjacent belt strips 55. The spacing between adjacent scan lines 58 (including the width of the belt strip 55 therebetween) is narrow enough so that a bottom-located bar code label, if it would not be read by a transverse scan line 60 at one end of the scan area belt 18, will be read by at least one of the parallel scan lines 58.

This requirement is generally met if the spacing between adjacent scan lines 58 is such that at least one scan line 58 will always read the label when the label is at 45° to the parallel scan lines 58. However, because of the oversquare amount in a standard bar code label, it is possible at least in theory that the parallel scan lines can be spaced farther apart than what would be required by the 45° requirement just described. The transverse scan line 60 should have the ability to read labels that are at 45° to the parallel scan lines 55 and in fact somewhat greater than 45° with respect to these lines (somewhat less than 45° with respect to the transverse scan line 60). This is again because of the oversquare amount in the bar code label, and this principle is indicated in FIG. 9.

Figure 9:
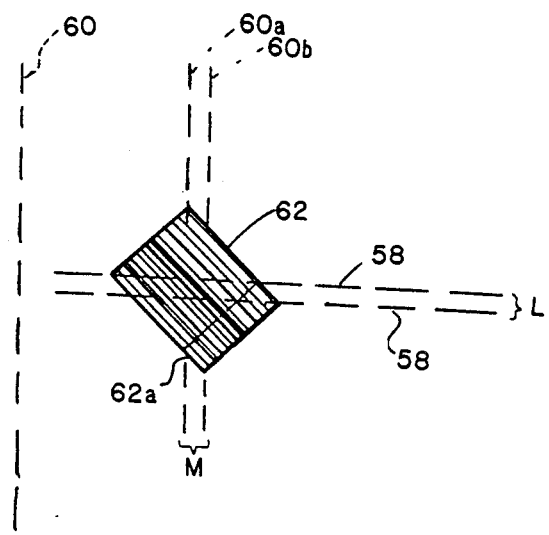
FIG. 9 is a schematic plan view illustrating principles of the bottom reading system of the invention.

FIG. 9 shows a bar code label 62 oriented at a theoretical worst-case position of 45° to the parallel scan lines 55 and to the transverse scan line 60. If a read is to be guaranteed at 45° then the critical maximum distance between adjacent scan lines 55 is illustrated as L. This is the distance which, using the oversquare portion 62a of the bar code 62, assures that one or the other of the two adjacent parallel scan lines 58 will cross all of the barsin the bar code, as illustrated. It can be seen that if the label 62 is shifted slightly up or down as seen in FIG. 9, one of the adjacent scan lines 58 will be more squarely in position to read all the bars of the label.

The readings by these parallel scan lines 58 are not as item speed-dependent or repetition rate-dependent as with the transverse line 60, since the label 62 moves along with the belt strips 55 for an appreciable distance and time. If the motion of the belt strips 55 is reasonably precise, the label 62 will remain at essentially the same position with respect to each parallel scan line 58 throughout the travel of the bar code over the length of the scan line 58. The scan lines may each be, for example, about 1.2 inches in length.

FIG. 9 illustrates that the transverse scan line 60, when the label is at 45°, has some latitude of distance M in reading the label 62, again because of the oversquare amount 62a as discussed above. However, the reading of the label by the scan line 60 within the envelope of distance and time M shown in FIG. 9 is very much item-speed and repetition rate-dependent, moreso than the situation with the parallel scan lines 58. If it is to be assured that either the parallel lines 58 or the transverse lines 60 will read the bottom label 62, and if the critical distance L between parallel lines is as shown, then the transverse line 60 must also obtain a good read, crossing all the bars substantially every time. This requires that the speed of item movement and the repetition rate of the transverse line 60 be such that the line 60 will be scan between the positions 60a and 60b illustrated in FIG. 9, i.e. within the critical distance M, substantially every time. (At 45° as shown, both L and M are equal to the oversquare distance times one-half the square root of 2.)

Thus, as repetition rate of the transverse scan line 60 is made higher and the speed of item movement is made slower, the distance between parallel scan lines 58 can be made greater, so that the transverse scan line 60 is relied upon to read the label in a greater range of angular orientation, and the parallel scan lines 58 will be relied upon in a lesser range of label orientations.

Therefore, the spacing between adjacent parallel scan lines 58 should be defined as narrow enough that, in orientations of the label wherein the transverse line 60 will not necessarily obtain a read, considering the repetition rate and the speed of item movement, one of the parallel lines 58 will necessarily obtain a read.

As outlined above the 45° position of the label 62 preferably is used for purposes of design in accordance with the present invention. It is preferable that a read by the parallel scan lines 58 be assured at the 45° label position, with the distance between adjacent scan lines 58 being set at L as a maximum. L is equal to the oversquare amount divided by the square root of 2, or one half the square root of 2 times the oversquare amount. For standard (minimum size) UPC bar codes, this means that a ¼ inch spacing between scan lines 58 will be under the maximum allowable distance L. In accordance with a preferred embodiment of the invention, the spacing between parallel scan lines is approximately ¼ inch in width, which includes the belt strip width and one gap width.

FIGS. 10A, 10B, 10C and 10D illustrate generally the manner in which the bottom scan lines may be generated, including both the transverse or cross sectional scan lines 60 and the parallel scan lines 58. As illustrated, each of the parallel or inline scan lines 58 spans a portion of the overall length of travel of the scan region conveyor. This is primarily due to optics involved in this preferred embodiment of the invention.

The cross sectional or transverse scan line 60 may be at the downstream end of the scan region conveyor, as indicated.

Figure 10B:
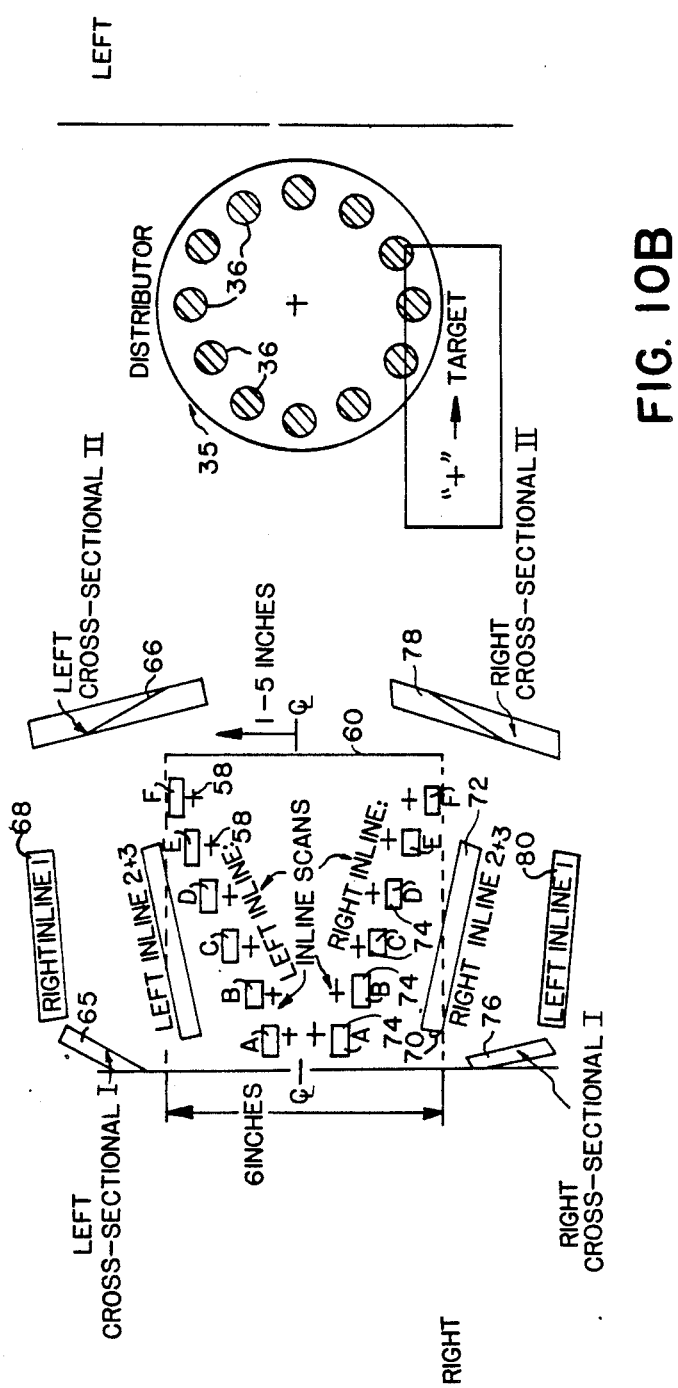

FIG. 10B, another schematic plan view rotated at 90° to FIG. 10A, shows generally a series of mirrors which may be used to reflect a scanned beam from the distributor wheel 35 to produce the transverse scan line 60 and the series of parallel or inline scan lines 58. FIG. 10B should be viewed inconjunction with FIGS. 10C and 10D.

In accordance with this preferred embodiment, all of the bottom scan lines (transverse and inline) are generated by two of the mirrors 36 on the distributor wheel 35. One distributor wheel mirror 36 preferably generates one half the transverse or cross sectional scan line 60 and one side, either left or right, of inline scans 58. Thus, if there are twelve parallel scan lines 58 as shown in FIGS. 3A and 3B, the beam sweeping from one of the distributor wheel mirrors 36 will generate either the left six o the right six.

Figure 10C:
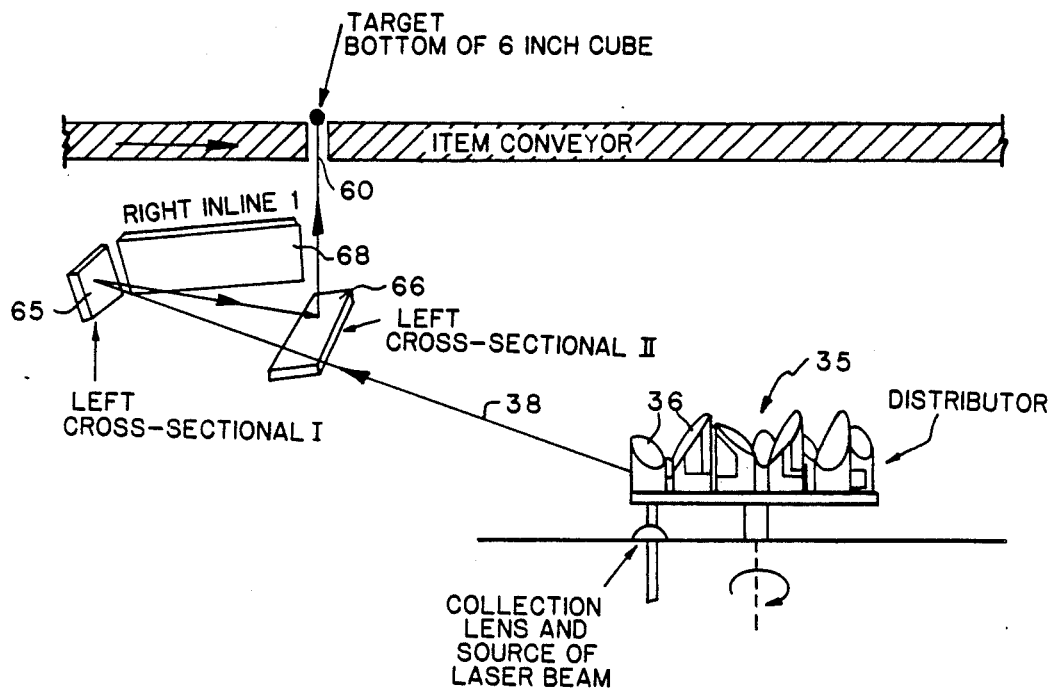

FIG. 10C illustrates that in accordance with the invention, the beam sweeping from one of the distributor wheel mirrors 36 may first form a left half of the transverse or cross sectional scan line 60 by reflection off beam deflector mirrors 65 and 66 shown in FIG. 10C, then all six of the right side inline or parallel scan lines 58 (see FIG. 10D), by reflection off a beam deflection mirror 68, then off a mirror pair 70, 72 (FIG. 10B). Following the mirror pair 70, 72 are a series of successive final-reflection inline mirror segments 74 (bearing notations A through F in FIG. 10B).

Figure 10D:
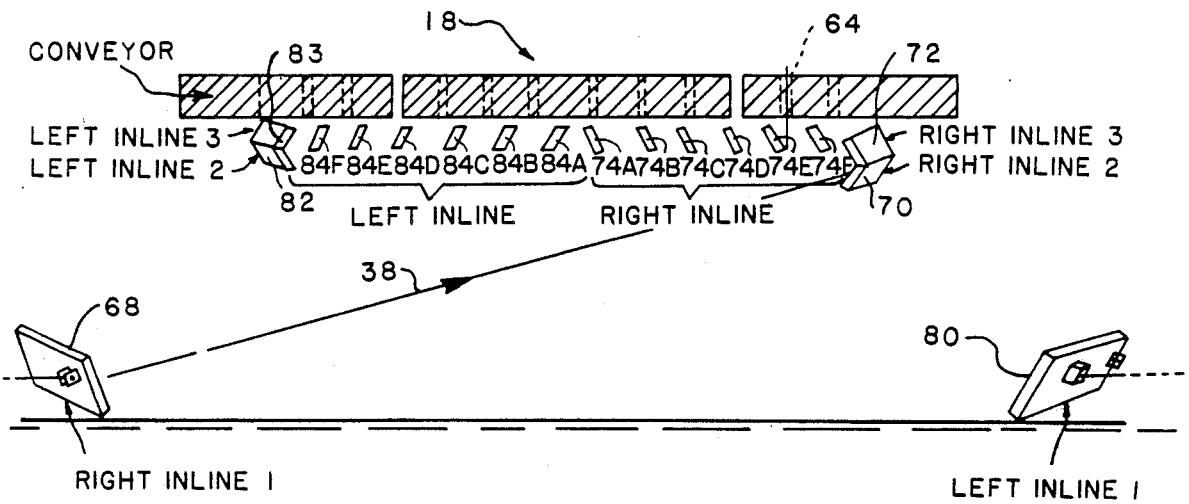

The mirror pair 70, 72 and the final mirrors 74A through F are also seen in the transverse cross sectional elevation view of FIG. 10D. FIG. 10D shows an example of the beam 38 leaving the right inline beam deflector mirror 68 and then reflecting off the mirror pair 70, 72, finally to be reflected off the final mirror segment 74E and up through a gap 64 in the scan area conveyor 18.

The sequence described above is repeated for the scan lines opposite those just described. As can be seen from FIG. 10B, the other half of the transverse scan line 60 is generated by a different distributor wheel mirror 36 sweeping the beam off a first right cross sectional mirror 76 and then a second right cross sectional mirror 78, to produce the right half of the transverse scan line 60. The same beam will then form the six right inline or parallel scan lines, with the rest of its arc of sweep. This is by reflection off a left inline beam deflector mirror 80, a left inline mirror pair 82, 83 and a series of left inline mirror segments 84A through 84F, as illustrated in FIGS. 10D and 10B.

It should be understood that the arrangments of mirrors shown schematically in FIGS. 3A, 3B and 10A through 10D are merely exemplary, and other arrangements can be used. For example, the needed scan geometry could be generated with two mirror wheels on one rotational shaft, each mirror wheel receiving a portion of the laser beam after splitting by a beam splitter. This can be an effective system for directing the beam into the scan volume from different angles. Selective use of independent laser-scanner-detector subsystems located to produce segments of the pattern already described is another example.

Figure 11:
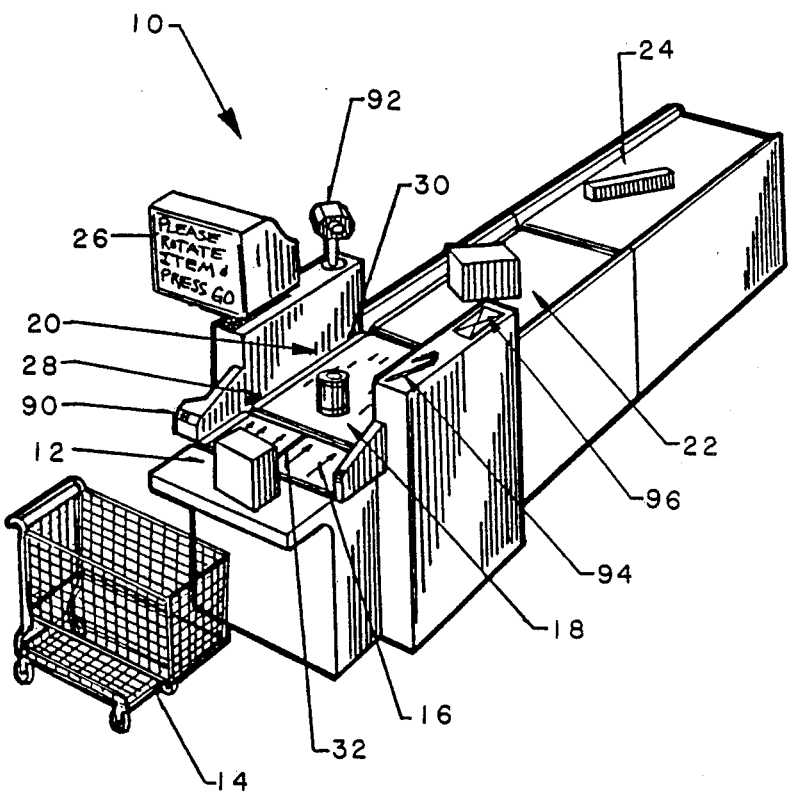
FIG. 11 is a perspective view similar to FIG. 1, illustrating an aspect of the system of the invention for handling "no reads".

In an automatic scanning system, there will inevitably be a number of "no reads". This can be for a variety of reasons, such as product size, irregularity of shape, location of the bar code label, damaged bar code, and other factors FIG. 11 illustrates a portion of the system of the invention, in a "no read" mode. Preferably the first or lead-in conveyor belt 16 is very short, for example about eight inches long. This discourages or makes it difficult for the customer to put more than one item on this input belt at one time.

When an item in the scan region 20 reaches the second item gate 30 and has not been read, both the scan region belt 18 and the input belt 16 can then be automatically reversed to return the item to the customer at the shelf 12. The display 26 then preferably displays a message such as "PLEASE ROTATE ITEM AND PRESS 'GO'". This signifies that the customer should press the "GO" buttom 90 indicated in FIG. 11. In addition, an audible message may be included, instructing the customer in the same way. It will be apparent to the customer what item is being referred to, since only one item was returned from the scan region 20 and since the input belt 16 is very short, most likely holding only one item at any on time.

If a "no read" again occurs, a video camera 92 (FIG. 1) may be used to automatically record the image of the "no read" item, for reference by a cashier on a monitor at the time of payment.

As an alternative, or in addition to the use of the video camera 92, the system can include a light pen 94, with the customer appropriately instructed to use the light pen to read the item after two occurrences of "no read". For example, on the second "no read" pass, the belts can reverse and return the item to the customer, with the screen 26 displaying the message "PLEASE MOVE LIGHT PEN OVER BAR CODE LABEL OF ITEM". Then, if a successful read occurs with the light pen, the screen 26 can instruct the customer to by-pass the scan region 20 with that item and move it directly to the output conveyor 22.

As an alternative to the light pen, the system can include a fixed scan window 96, over which the customer is instructed to move the item with the bar code appropriately oriented.

A large depth of field for resolving bar codes with the scanned beam is essential in the system of the invention, primarily because of widely varying sizes of items and varying placement of items on the conveyor by the customer. The beam waist capable of resolving a standard (minimum size) bar code in a typically focused laser beam is limited to about three inches, i.e. plus or minus 1.5 inches from the point of best focus. This is generally not sufficient for the system of the present invention, which must achieve a very high successful first read rate.

In accordance with the invention, an enlarged depth of field subsystem doubles the available depth of focus to about six inches, so that the ability to read bar codes at varying distances is greatly enhanced.

Figure 12:
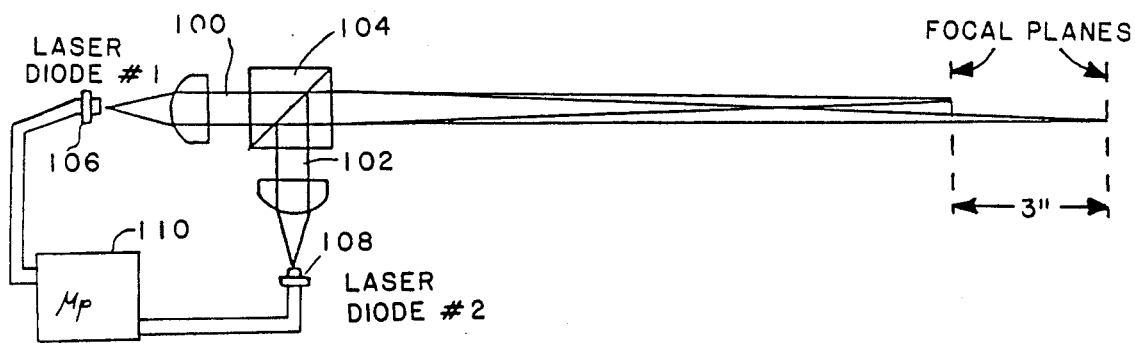
FIG. 12 is a schematic view showing a depth of field enhancement system which may be used in accordance with the invention to read bar codes located within a relatively wide depth of field within the scan volume.

FIG. 12 illustrates the principle of the depth of field enhancement subsystem used in accordance with the present invention. The system employs two polarized laser beams 100 and 102 directed from positions 90° from each other toward a beam-splitter/combiner element such as a beam-splitter cube 104. The beam-splitter cube 104 allows the superposition of two polarized laser beams without loss of power, by transmitting substantially 100% of beam power from the polarized beam 100 and reflecting substantially 100% of beam power from the polarized beam 102, whose polarization is at right angles to that of the beam 100. A lower cost, conventional beam-splitter could be used as an alternative, since power loss may not be an issue.

Preferably, the sources of the polarized beams 100 and 102 are laser diodes 106 and 108. A microprocessor 110 of the scanning system, also associated with the decode system, can switch instantaneously from one diode to the other depending on the level and modulation of the return signal received by the scanner. The two diodes 100 and 102 are never energized simultaneously. Thus, at a time when the first diode 100 is energized, and the decode system indicates that the level and modulation of the return signal do not indicate a focused beam scanning over a bar code, the microprocessor 110 can instantaneously switch to the other diode 102. The return signal from each beam can be measured alternately then the signal with largest modulation can be used for decoding, representing the beam in best focus at the bar code. Other means for increasing the useful depth-of-field for scanning bar code labels, are possible. For example, mechanical means can be used for moving different lenses into the path of the laser beam to focus it at different locations. Alternatively, a pair of lenses in the beam with means to adjust separation between lenses axially can be used.

In operation of the system of the invention, as used as a retail point-of-sale scanner, a customer moves the shopping cart 14 adjacent to the shelf 12 at one of a series of check-out locations as indicated in FIG. 1. The customer is instructed by the display 26 or by a separate sign to press a start button 90 or the customer otherwise initiates the startup of the conveyor belts 16, 18 and 22. For example, the initiation can be by a photodetector (not shown) detecting the presence of the first item placed on the shelf 12. (The no-read "GO" button 90 can also serve as a start button.)

With this initiation, the scanner system may assign a customer number to the customer, assuming the previous customer has finished. The customer unloads items onto the shelf 12, and is instructed to place items one at a time on the center line 32 of the lead-in or input belt 16 (as indicated in FIG. 1). The first item is moved by the belt 16 across the first item gate 28 and into the scan region 20, and is conveyed through the scan region by the scan region conveyor 18. The scanner is then activated to attempt a reading from all sides of the items, including four approaches to vertical faces of the item as illustrated in FIG. 4, including a top scan (see FIGS. 3A and 3B), and via the bottom scan up through the conveyor 18 as explained above with reference to FIGS. 8 through 10D. The scan area conveyor 18 preferably has a speed greater than the speed of the input conveyor 16, to insure that there is some space between the items. This allows the item gates 28 and 30 to keep track of each item, preferably along with a product number.

The scanner itself, via the system of mirrors schematically indicated in Figures described above, is designed to scan the six faces of an idealized cube with two scan lines for each face substantially at 90° to each other in an "X", as discussed above. The X configuration achieves the omnidirectional scanning without redundant scan lines. The laser beam and retrodirective optics are directed vertically up from below the idealized cube, by a beam distribution system such as described above.

Each of the scan lines is sent out from a different final reflection mirror.

The distribution wheel 35 shown in FIG. 3 may run at about 1500 RPM, so that each scan line has a repetition rate of 1500 per minute or 25 per second. However, this may vary with belt speed and other factors discussed above.

Each beam is finally reflected by beam deflection mirrors onto one of the six faces of the idealized cube. The distance from the collection lens of the reading optics to the face of each cube is held constant (and may be about 36.5 inches) to allow the same optics to be used for each scan line.

As outlined above, if an item is read successfully on the first pass through the scan region, this is noted in the microprocessor and the item crosses the second item gate, allowing a succeeding item to be delivered onto the scan region conveyor 18. However, if a succeeding item is placed too far up the input conveyor 16 by a customer and reaches the item gate 28 before the first item has crossed the second item gate 30, the input conveyor 16 may be stopped to prevent the second item from progressing into the scan region until the first item has exited. The first item gate 28 preferably is positioned a short distance back from the beginning of the scan region conveyor 18.

There will be some "no reads", and "no reads" may be addressed as outlined above. First, the item is returned to the customer via reversal of the conveyors 18 and 16, and the customer is instructed to rotate the item to a different position and again place it on the center line of the belt 16, as discussed with respect to FIG. 11. If again a "no read" occurs, the customer is preferably instructed to use the light pen 94 (FIG. 11) or the auxiliary window 96 to effect a proper reading, if possible. If a good read is obtained with the light pen, the customer is instructed to bypass the scan region and place the item at the bagging station. If again a good read is not obtained, even using the light pen, the video camera 92 can automatically record an image of the "no read" item, which will be displayed on a monitor at the cashier station. This enables the cashier to identify the product and its price and manually add this to the total. The system may also give the cashier a total number of items that have been read, in case the customer's bag needs to be checked for security reasons.

Once all of the customer's items have been moved through the scanner system 10, including "no reads", they may be bagged by the customer or by a bagging assistant. From here, they are taken to the cashier along with a dispensed list or tally 112 (not shown) of the items which may bear a machine-readable code as discussed above, and the customer is charged the appropriate amount by the cashier. Alternatively, or in addition, the list may be conveyed electronically to the cashier along with a customer number. Some form of list or display preferably is shown to the customer before the customer approaches the cashier.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. An automatic scanner for automatically scanning bar code labels of selected items substantially without an attendant, comprising:

item conveyor means for automatically moving items through an item path including a scan region, bar code laser scanner means for scanning with one or more laser beams a volume of space in which an item bar code label might be located, including means for scanning for the label on substantially all surfaces of the item, item gate means for determining the presence of an item on the product conveyor means as the item reaches a preselected point in the item scan path and for determining whether the item has exited the scan region at the time a succeeding item approaches the scan region, and for inhibiting the progress of the succeeding item until the first item has exited the scan region and then enabling the succeeding item to continue its movement into the scan region, and decoding means for receiving signals from the scanning of the bar code labels and for compiling data relating to the items whose bar codes have been read and for preparing a tabulation of said items.

2. The scanner of claim 1, including bottom reading means including a moving scan region conveyor which comprises a plurality of parallel belt strips, with means for scanning a beam up through spaces between the belts to read a bar code located on the bottom of an item.

3. The scanner of claim 1, wherein the scanning means include means for scanning the laser beam with enhanced depth of field capable of resolving a UPC or other bar code label 4. The scanner of claim 1, including item return means for returning "no read" items which the scanner is unable to read.

5. The scanner of claim 1, wherein the item conveyor means comprises a plurality of separate conveyors serially positioned, including a short first conveyor belt, sufficiently short to discourage a customer from placing more than one item on the first conveyor belt, and a scan region conveyor downstream of the first conveyor belt.

6. The scanner of claim 5, including conveyor reversal means connected to the item gate means, for reversing the first conveyor belt in the event said succeeding item approaches the scan region before said first item has exited the scan region.

7. The scanner of claim 5, wherein the scan region conveyor has a speed which is higher than the speed of the first conveyor belt, so that an item in the scan region moves faster than an item approaching the scan region reducing likelihood of an item reaching the scan region before a preceeding item has exited the scan region.

8. The scanner of claim 1, further including means for recording an image of a "no read" item, and for displaying the image at a cashier.

9. The scanner of claim 1, further including means for increasing the speed of the scan region conveyor once an item within the scan region has been read.

10. The scanner of claim 1, further including a depth of field enhancement system for the laser beam, comprising, a pair of separate laser sources, each producing a laser beam, beam combining means for superimposing the two laser beams substantially on a single beam path, the beams oriented in the same direction, focusing means associated with each of the laser beams, including first beam focusing means for focusing the first beam to converge to a first focal plane at a first position in space and second beam focusing means for focusing the second beam to converge to a second focal plane at a second position in space, spaced from the first focal plane, each beam having a beam waist sufficiently focused to resolve a typical bar code, and the two focal planes of the two beams being spaced at a distance such that most of the beam waist of the second beam is non-coextensive from the beam waist of the first beam so as to generally add the two beam waists to produce a longer effective bar code resolving depth of field than the beam waist of either beam.

11. The depth of field enhancement system of claim 10, wherein the two laser sources comprise laser diodes.

12. A bar code scanning device for reading bar codes on the bottom surfaces of items being advanced through an item movement path, comprising:
  a belt type conveyor comprising a plurality of spaced parallel belt strips having gaps between the belt strips providing an unobstructed line of view of the bottom surfaces of items on the conveyor from below, with conveyor rollers supporting the conveyor at spaced locations,
  bar code laser scanner means for scanning a laser beam in a plurality of scanning planes extending between the belt strips in said gaps so as to define scanning lines at the conveyor surface parallel to and between the belt strips, and for scanning a laser beam in a generally vertical plane perpendicular to the belt strips and parallel to an axis of one of said conveyor rollers and closely adjacent to the conveyor at said one conveyor roller, and
  the distance between parallel scanning lines on either side of a belt strip being sufficiently small as to assure that a UPC bar code printed on the bottom of an item can be read by the laser scanning means between the belt strips when the UPC bar code is at 45° to said scanning lines between the belt strips, whereby bar codes oriented at 45° or greater to the scanning lines between the belt strips can be read between the belt strips, and bar codes oriented at 45° can be read in said plane perpendicular to the belt strips and adjacent to the conveyor.

13. The bar code scanning device of claim 6 wherein the scanning lines between belt strips are spaced at about one-fourth inch.

14. The bar code scanning device of claim 12, wherein the bar code laser scanning means includes means for generating a beam sweeping generally in a horizontal plane generally perpendicular to the direction of movement of the conveyor means and for subsequently breaking the sweeping beam into a plurality of beams successive in time and successively in said plurality of scanning planes which are generally vertical, each of said plurality of scanning planes being between adjacent ones of the belt strips, forming said parallel scanning lines at the conveyor surface.

15. An automatic scanner for scanning a beam across bar codes of items moving through the scanner, substantially without a skilled attendant, comprising:
  item conveyor means for receiving items placed thereon and for automatically moving the items through an item path including a scan region,
  bar code scanner means for scanning with a beam a volume of space in which a product bar code label might be located, including means for scanning in multiple directions to read the label which might be located on any of a number of different surfaces on the item,
  display means for issuing instructions to a customer for the use of the scanner, including for initiating the scanning process,
  item exclusion means for assuring that only one item will be capable of being read and recorded at any one time,
  decoding means for receiving signals from the scanning of the bar code labels and for compiling data related to the items whose bar codes have been read and for preparing a tabulation of such items,
  no read handling means for indicating when an item is not read on passing through the scan region, and
  means for terminating the scanning process.

16. The automatic scanner of claim 15 wherein the no read handling means includes return means for returning the non-read item to the customer and, in conjunction with the display means, for instructing the customer to rotate the item and again place it on the item conveyor means.

17. The automatic scanner of claim 16 wherein the no read handling means further include means for making a video recording of the image of an item which has failed to be read on multiple passes through the scan region.

18. The automatic scanner of claim 15 including bottom reading means in the scan region for reading a bar code located on the bottom surface of an item as the item is moved through the scan region.

19. The automatic scanner of claim 18 wherein the bottom reading means comprises a scan region conveyor formed of a plurality of parallel belts sections or strips, and with means for scanning a beam upwardly through spaces between the parallel belt strips in scan lines parallel to the belt strips, and transverse scanning means for scanning a beam perpendicular to the belt strips, adjacent to one end of the scan region conveyor.

20. The automatic scanner of claim 15 wherein the no-read handling means includes light pen means for manual reading of a bar code and means for instructing the customer to use the light pen means to manually read a no-read bar code.

21. A bar code label scanning apparatus for scanning and reading bar codes located on the bottom surfaces of items moving along an item movement path, comprising:
  a scan region conveyor comprising a series of spaced parallel endless belt strips, with a gap between adjacent belt strips providing an unobstructed elongated window of view from below of a portion of the bottom surface of an item supported on and moving with the belt strips, with rollers supporting the belt strips at forward and rearward ends of the upper surface of the scan region conveyor,
  bar code laser scanner means for scanning a laser beam upwardly in a plurality of generally vertical scanning planes extending between the belt strips in said gaps so as to define at the upper conveyor surface a plurality of scanning lines parallel to and between the belt strips, and further for scanning a laser beam upwardly in a transverse plane adjacent to one end of the scan region conveyor to define at the upper conveyor surface a transverse scanning line with respect to the plurality of parallel scanning lines, and the spacing between adjacent ones of said plurality of parallel scanning lines being sufficiently small as to substantially assure that, taking into consideration the speed of movement of the conveyor and the repetition rate of the transverse scanning line, all orientations of a bottom-located UPC bar code labels which are not read by the transverse scanning line will be read by one of the plurality of parallel scanning lines.

22. The label scanning apparatus of claim 21, wherein the spacing between adjacent parallel scanning lines is no greater than about ¼ inch.

23. A depth of field enhancement system for a bar code label scanner having a laser source for producing a beam and a scanning mechanism for scanning the beam toward a scan region within which a bar code label is to be read, comprising,
 a pair of separate laser sources comprising two independent lasers, each producing a laser beam,
 beam combining means for superimposing the two laser beams substantially on a single beam path, the beams oriented in the same direction,
 focusing means associated with each of the laser beams, including first beam focusing means for focusing the first beam to converge to a first focal plane at a first position in space and second beam focusing means for focusing the second beam to converge to a second focal plane at a second position in space, spaced from the first focal plane,
 each beam having a beam waist sufficiently focused to resolve a standard UPC bar code, and the two focal planes of the two beams being spaced at a distance such that most of the beam waist of the second beam is non-coextensive from the beam waist of the first beam so as to generally add the two beam waists to produce a longer effective bar code resolving depth of field than the beam waist of either beam.

24. The depth of field enhancement system of claim 23, including beam signal decoding means for measuring, when a signal has been received, the return signal from each beam alternately, and using the signal with larger modulation, representing the beam in best focus at the bar code, for decoding.

25. The depth of field enhancement system of claim 23, wherein the two laser sources comprise laser diodes 26. The depth of field enhancement system of claim 25 wherein the beam combining means comprise a beam splitter cube or mirror, with the two laser diodes outputting polarized beams directed at the beam splitter from orientations substantially at right angles with respect to each other, with the beams emerging from the beam splitter along a common beam path.

27. The depth of field enhancement system of claim 23, wherein the beam waists are substantially non-coextensive so as to be fully added together in tandem to produce a bar code resolving depth of field essentially equal to the total depth of the two beam waists.

28. The depth of field enhancement system of claim 27, wherein the bar code resolving depth of field is about 6 inches.

29. The depth of field enhancement system of claim 23, including laser source switching means for switching the two sources on and off in opposition to each other with a fixed periodicity.

30. The depth of field enhancement system of claim 23, including automatic means for initially switching the two laser sources on alternately to determine the character of reflection of reflected light received and for selecting the laser source having the best return signal indicating the best focus and for continuing the scan line with that laser source.

* * * * *